United States Patent
Kishigami et al.

(10) Patent No.: US 6,480,468 B1
(45) Date of Patent: Nov. 12, 2002

(54) REPEATER

(75) Inventors: Tohru Kishigami, Ome; Kazuo Nogami, Sagamihara; Shigeo Matsuzawa, Tokyo; Kenichi Nagami, Funabashi, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/308,132

(22) PCT Filed: Sep. 17, 1998

(86) PCT No.: PCT/JP98/04194

§ 371 (c)(1),
(2), (4) Date: May 14, 1999

(87) PCT Pub. No.: WO99/14895

PCT Pub. Date: Mar. 25, 1999

(30) Foreign Application Priority Data

Sep. 17, 1997 (JP) .............................. 9-252160

(51) Int. Cl.$^7$ .............................................. H04L 12/56
(52) U.S. Cl. ..................... 370/230.1; 370/254; 370/389; 370/395.52; 370/400; 709/235; 709/238
(58) Field of Search ................................ 370/225, 226, 370/230, 230.1, 231, 235, 237, 242, 243, 244, 250, 254, 351, 352, 389, 395.1, 395.2, 395.5, 395.52, 400, 401, 465; 709/220, 221, 230, 234, 235, 238, 242, 243, 244, 249

(56) References Cited

U.S. PATENT DOCUMENTS

| | | | | |
|---|---|---|---|---|
| 5,828,844 A | * | 10/1998 | Civanlar et al. | 395/200.58 |
| 5,903,559 A | * | 5/1999 | Achayya et al. | 370/355 |
| 5,996,021 A | * | 11/1999 | Civanlar et al. | 709/238 |
| 6,021,263 A | * | 2/2000 | Kujoory et al. | 395/200.62 |

FOREIGN PATENT DOCUMENTS

| | | | | |
|---|---|---|---|---|
| JP | 0 781 010 A2 | * | 6/1997 | .......... H04L/12/56 |
| JP | 9-172457 | | 6/1997 | |

OTHER PUBLICATIONS

"Cell Switch Router for Next Generation Internet" (in Japanese), Open Network, Ascii Corp. (Japan), 1 (8) :102–105, (1996).
"IP Switching System Strengthening Backbone of Intranet" (in Japanese), Open Network, Ascii Corp. (Japan), 2 (2) :118–125, (1997).
"Trend of New Switching/Routing Technique" (in Japanese), Open Network, Ascii Corp. (Japan), 2 (7) :108–109, (1997).
K. Omusha, "Cell Switch Router for Interconnecting ATM Switches" (in Japanese) Computer & Network LAN, 15 (5) :45–52, (1997).
H. Esaki, "High Speed IP Packet Forwarding Over Internet Using ATM Technology", Proceedings SPIE, vol. 2608, p. 44–52, (1995).
S. Matsuzawa et al., "Cell Switch Router", IEICE (Japan), IN95–146, p. 179–184, (1996).

* cited by examiner

Primary Examiner—Alpus H. Hsu
(74) Attorney, Agent, or Firm—Finnegan, Henderson, Farabow, Garrett & Dunner, L.L.P.

(57) ABSTRACT

The present invention aims at making the cut-through trigger variable in accordance with the traffic environment, thereby increasing the cut-through traffic to enhance the efficiency of communication. In the trigger filtering unit (16A), the number of transfers of the hop-by-hop packet meeting each of a plurality of preset trigger conditions is counted. In the processor (15A), the rate of the traffic meeting each of trigger conditions to all the traffics of the hop-by-hop transfer is calculated in accordance with the count value, a trigger condition under which the rate exceeds the threshold value is selected as the cut-through trigger, and it is determined which of the cut-through transfer mode and the hop-by-hop transfer mode should be selected.

5 Claims, 10 Drawing Sheets

CONTENT ADDRESSABLE MEMORY 71

| | SEARCH KEY | | | | POINTER |
|---|---|---|---|---|---|
| 1 | D_IP_Address | S_IP_Address | | | Pointer |
| 2 | D_IP_Address | S_IP_Address | D_Port# | S_Port# | Pointer |
| 3 | D_IP_Address | | | | Pointer |
| ⋮ | | | | | |
| n | D_IP_Address | S_IP_Address | D_Port# | S_Port# | Pointer |

D_IP_Address : DESTINATION IP ADDRESS
S_IP_Address : SOURCE IP ADDRESS
D_Port#      : DESTINATION PORT NUMBER
S_Port#      : SOURCE PORT NUMBER
Pointer      : POINTER INFORMATION FOR FORWARDING TABLE

FIG. 7

HASH SEARCHING POINTER TABLE 72

| | IP-Address <-> Pointer | |
|---|---|---|
| 1 | D_IP_Address | Pointer |
| 2 | D_IP_Address | Pointer |
| ⋮ | | |
| k | D_IP_Address | Pointer |

D_IP_Address : DESTINATION IP ADDRESS
Pointer      : POINTER FOR FORWARDING TABLE

FIG. 8

FORWARDING TABLE 73

| | FORWARDING TABLE | | |
|---|---|---|---|
| 1 | VPI, VCI | QOS Flag | etc. |
| 2 | VPI, VCI | QOS Flag | etc. |
| ⋮ | | | |
| m | VPI, VCI | QOS Flag | etc. |

FIG. 9

REPEATER

TECHNICAL FIELD

The present invention relates to a repeater provided to execute packet routing process in, for example, a computer network or LAN.

BACKGROUND ART

Some of repeaters generally called routers have the hop-by-hop transfer mode and the cut-through transfer mode as packet routing modes.

The hop-by-hop transfer mode is a mode to execute the packet routing process in a network layer. In this mode a destination IP address and control information are extracted from the received IP packet data, the transfer destination is determined in accordance with the extracted destination IP address and control information, and the IP packet data is transmitted in a line corresponding to the transfer destination. A series of the processes according to the hop-by-hop transfer are conventionally implemented by the software process with a processor.

On the other hand, the cut-through transfer mode is a mode to execute the packet switching process in data link layer. In accordance with a protocol of a layer upper than a transport layer used to exchange the information between adjacent repeaters, a bypass transfer path called a cut-through transfer path is established at a hardware switch, and the packet routing is executed via the cut-through transfer path. Since the cut-through transfer mode is processed by the hardware, the high-speed routing can be executed.

Incidentally, in the repeater having these transfer modes, when the data flow is input therein, it is determined which of the hop-by-hop transfer and the cut-through transfer should be executed, in accordance with the condition to determine whether or not the cut-through transfer should be executed, i.e. the cut-through trigger. As for the cut-through trigger, a specific port number included in a TCP (Transmission Control Protocol) of the first packet (hereinafter called a trigger packet) in each data flow is always used.

FIG. 1 is a circuit block diagram showing an example of configuration of a repeater using an ATM switch as a hardware switch. In this figure, a plurality of input lines IL1 to ILn−1 and a plurality of output lines OL1 to OLn−1 are contained in an ATM switch unit 1.

When the ATM cells constituting the first packet of the data flow which should subjected to the routing process are input to the ATM switch 1 via any one of the input lines IL1 to ILn−1, these ATM cells are input to a packet assembly/disassembly unit (SAR: Segmentation and Reassembly Sublayer) 3 via the output line OLn and assembled as the packet in a frame memory 4.

When a processor 5 is informed of the end of assembly of the packet by the SAR 3, the processor 5 determines whether the data flow in which the packet flows should be subjected to the hop-by-hop transfer or the cut-through transfer, by referring to the port number of the TCP of the packet.

It is assumed now that, for example, the port number of the TCP would be registered in advance as the cut-through trigger. The processor 5 determines the cut-through transfer mode and sets the switching information for the cut-through transfer on the switching table 2. Therefore, after that, the ATM cells of the same data flow arriving via the input lines are subjected to the cut-through transfer via any one of the output lines OL1 to OLn−1 by the ATM switching unit 1, in accordance with the switching information which has been set on the switching table 2.

On the other hand, if the port number of the TCP is not registered as the cut-through trigger, the processor 5 determines the hop-by-hop transfer mode and sets on the switching table 2 the switching information that allows the packet of the same data flow input in the ATM switch unit 1 to be output to the output line OLn. For this reason, after that, the ATM cells of the same data flow arriving via the input lines are input from the ATM switch unit 1 to the SAR 3 via the output line OLn and assembled as the packet on the frame memory 4.

When the assembly has been ended, SAR 3 informs the processor 5 of the fact that the hop-by-hop packet has arrived, together with the address information of the frame memory 4. When the processor 5 receives this information, the processor 5 executes the routing process in accordance with source address, destination addresses and the like that are inserted into the header information of the packet.

When the processor 5 has ended the routing process, the processor 5 informs the SAR 3 of the fact that the transmission packet exists in the frame memory 4. When the SAR 3 is informed of the fact, the SAR 3 takes out of the frame memory 4 the packet which should be transmitted, and disassembles the packet into the ATM cells, and transfers them to the ATM switch unit 1 via the input line ILn. The ATM switch unit 1 transmits the ATM cells transferred from the SAR 3, to the output line corresponding to the destination thereof, in accordance with the information which is set on the switching table 2 by the above-mentioned routing process.

Thus, every time the data flow is input via the input lines, the cut-through transfer process or the hop-by-hop transfer process is selectively executed in accordance with the TCP port number of the first packet.

The initial object to execute the cut-through transfer is not to subject the packet in the network layer to the routing process with the software process made by the processor, but to execute a high-speed packet routing process with the hardware switching process in the data link layer. Therefore, the efficiency of transfer in the repeater becomes higher as the rate of the traffic in the cut-through transfer is higher.

In the conventional repeater, however, the TCP port number is fixedly registered as the cut-through trigger and it is determined which of the cut-through transfer and the hop-by-hop transfer should be executed in accordance with this port number, as described above. For this reason, the traffic environment in which the repeater is used may cause the traffic amount of the cut-through transfer to be reduced and the traffic amount of the hop-by-hop transfer to be increased, thereby failing to enhance the efficiency of communication.

The present invention has been accomplished in consideration of the above-mentioned circumstances, and its object is to provide a repeater capable of varying the cut-through trigger in accordance with the traffic environment, thereby increasing the amount of the cut-through trigger and enhancing the efficiency of communication.

DISCLOSURE OF INVENTION

In order to achieve the above object, the present invention provides a repeater having a hop-by-hop transfer mode in which a packet routing process is executed in a network layer and a cut-through transfer mode in which a packet switching process is executed in a data link layer, for executing a packet routing process by selectively using the modes, comprising:

traffic monitoring means for detecting a traffic of the hop-by-hop transfer meeting each of a plurality of predetermined conditions that can be cut-through triggers; and condition selecting means for comparing an amount of the traffic of each of the conditions obtained by the traffic monitoring means with a predetermined threshold value, and selecting a condition under which the amount of traffic exceeds the threshold value as the cut-through trigger, wherein determination whether a received packet should be subjected to the cut-through transfer or the hop-by-hop transfer is executed in accordance with the condition selected by the condition selecting means and the routing process is executing in accordance with a result of the determination.

Particularly, the traffic monitoring means is characterized by selecting, for example, at least two of the TCP port number, the packet having a specific length, the UDP multi-cast and a specific line number at which the packet is input, as the conditions which can be the cut-through triggers, and detecting the traffics of the hop-by-hop transfer meeting the respective conditions.

Therefore, according to the present invention, the traffic amount of the hop-by-hop transfer is detected in relation to each of plural conditions that can be the cut-through triggers, such as the TCP port number, the packet having a specific length, the UDP multi-cast and a specific line number at which the packet is input, and the condition under which the detected traffic value exceeds a threshold value is selected as the cut-through trigger. That is, the condition with a higher traffic of the hop-by-hop transfer at the current time is selected and used as the cut-through trigger, in accordance with the variation in the traffic environment. For this reason, the traffic of the cut-through transfer can be always maintained to be higher, and thereby the efficiency of communication of the repeater can be enhanced.

In addition, the present invention is also characterized in that the traffic monitoring means uses a counter to count the number of transfer traffics of hop-by-hop packet meeting each of the plurality of predetermined conditions that can be the cut-through triggers, and that the condition selecting means obtains a rate of the traffic under each of the conditions to entire hop-by-hop transfer traffics in accordance with the count value of each of the conditions obtained by the counter of the traffic monitoring means, and selects a condition under which the rate exceeds the threshold value as a cut-through trigger.

Thus, by constituting the traffic monitoring means with the counter, detection of the traffic can be implemented by simple hardware and increase in dimensions of the arrangement of the repeater can be restricted as much as possible.

Further, the present invention is also characterized in that the traffic monitoring means detects the traffics, in a certain previous period, of the hop-by-hop transfer meeting each of the plurality of predetermined conditions that can be cut-through triggers.

With this structure, the variation in the current traffic can be detected further exactly by excluding any influence of the previous traffic detection value, and the rate of the cut-through transfer can be thereby highly maintained and the efficiency of communication in the repeater can be further enhanced.

Moreover, in the present invention, the traffic detection process of the traffic detecting means, and the cut-through transfer process and the hop-by-hop transfer process of the routing processing means are executed with hardware circuits, respectively, and the process of selecting the condition which can be the cut-through trigger by the condition selecting means is executed in the software process with a processor.

With this structure, the traffic detection process and the hop-by-hop transfer process can be accelerated by the hardware process, and the efficiency of communication in the repeater can be thereby further enhanced. In addition, since the load of process on the processor can be reduced, a high speed processor does not need to be provided and thereby the price of the repeater can be lowered.

BRIEF DESCRIPTION OF DRAWINGS

FIG. 7 is a view showing an example of a configuration of a content addressable memory in the routing processing unit shown in FIG. 6.

FIG. 8 is a view showing an example of a configuration of a HASH searching pointer table in the routing processing unit shown in FIG. 6.

FIG. 9 is a view showing an example of a configuration of a forwarding table in the routing processing unit shown in FIG. 6.

BEST MODE OF CARRYING OUT THE INVENTION

The present invention will be described in detail with reference to the attached drawings.

(1st Embodiment)

Figure 1:
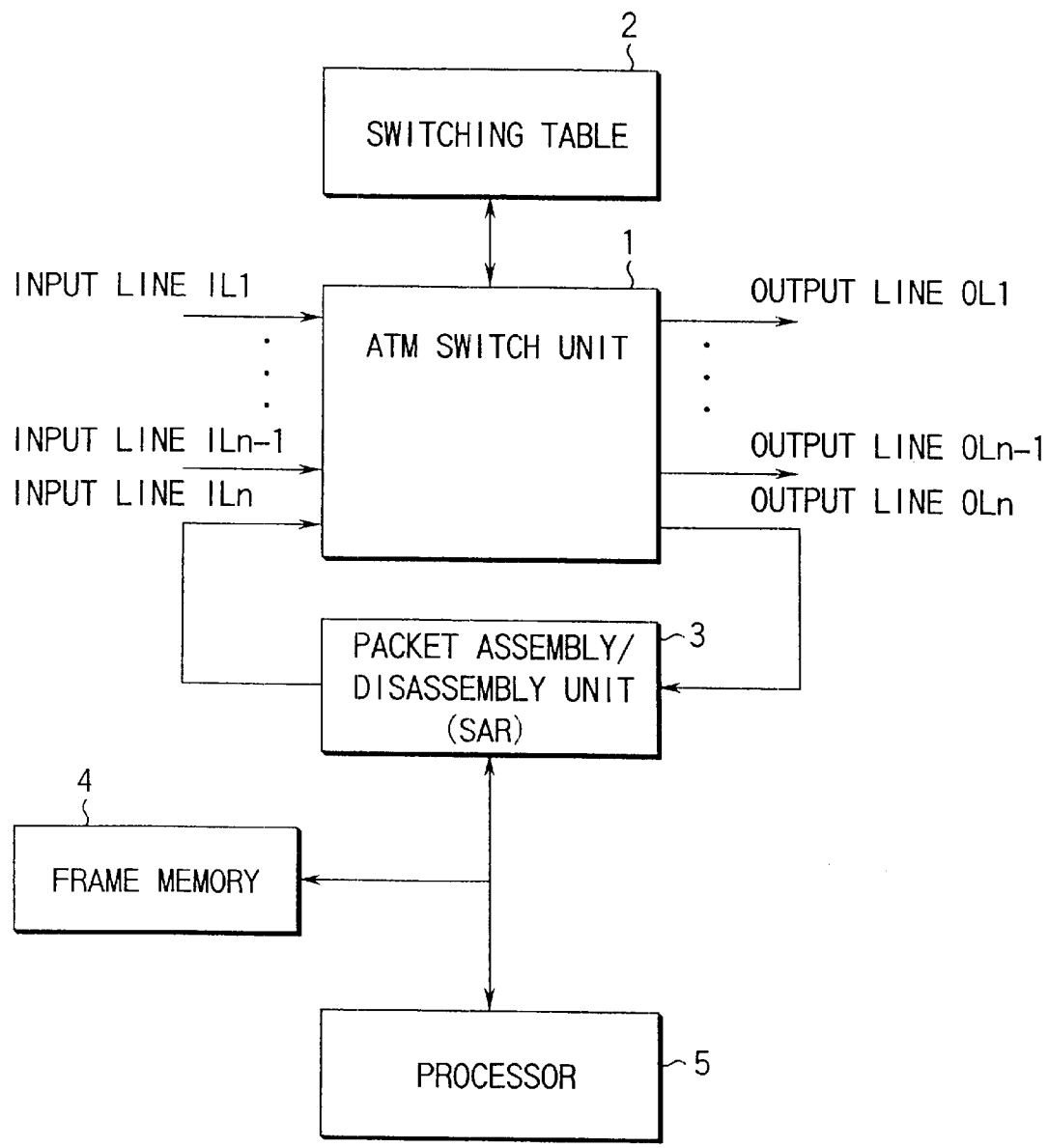
FIG. 1 is a block diagram showing an example of configuration of a conventional repeater.
Figure 2:
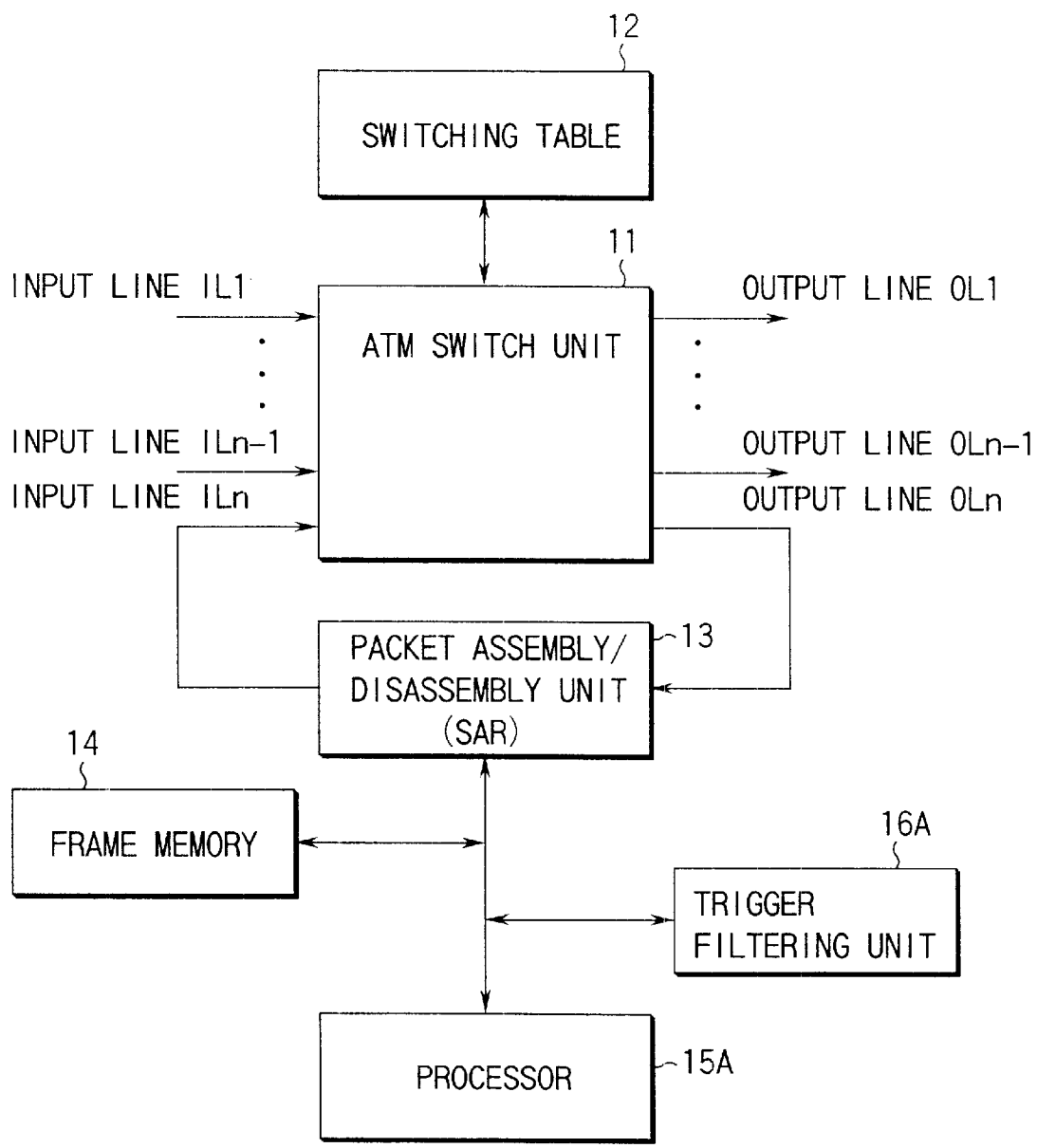
FIG. 2 is a block diagram showing a first embodiment of a repeater according to the present invention.

FIG. 2 is a circuit block diagram showing a first embodiment of a repeater according to the present invention.

This repeater comprises an ATM switch unit 11, a switching table 12, a packet assembly/disassembly unit(SAR) 13, a frame memory 14, a processor 15A and a trigger filtering unit 16A.

A plurality of input lines IL1 to ILn and output lines OL1 to OLn are contained in the ATM switch unit 11. Of the input lines IL1 to ILn and the output lines OL1 to OLn, the input lines IL1 to ILn−1 and the output lines OL1 to OLn−1 are used to transfer ATM cells with other repeaters, and the remaining input line ILn and output line OLn are used to transfer the ATM cells between the ATM switch unit 11 and the packet assembly/disassembly unit (SAR) 13.

Switching information to which the ATM switch unit 11 refers when it carries out switching of the ATM cells is stored in the switching table 12. The switching information is modified by the processor 15A (to be described later).

The packet assembly/disassembly unit (SAR) 13 carries out the process of assembling the ATM cells which arrive via the input lines IL1 to ILn–1 as a packet and the process of disassembling the packet which is stored in the frame memory 14 and should be transmitted into the ATM cells.

As for a plurality of conditions (hereinafter called trigger conditions) that can be preset cut-through triggers, the trigger filtering unit 16A counts the number of transfers of hop-by-hop packet meeting the respective conditions and thereby detects the traffic of the hop-by-hop transfer under each of the conditions.

Figure 3:
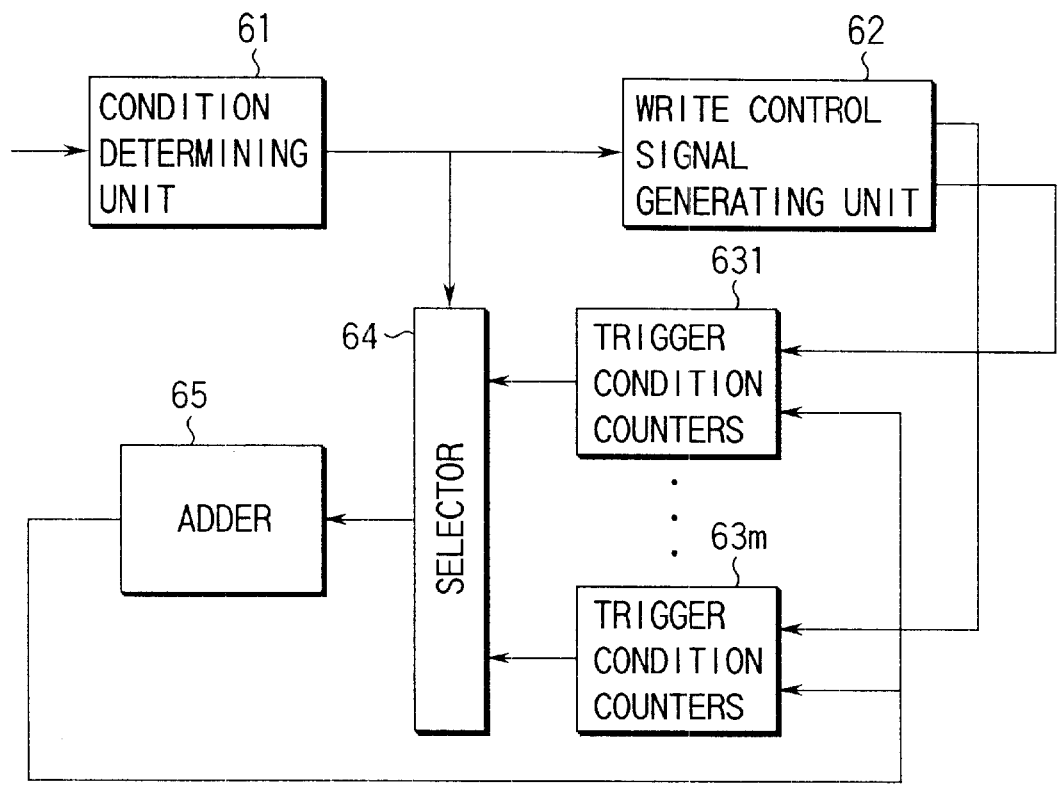
FIG. 3 is a circuit block diagram showing a configuration of a trigger filtering unit of the repeater shown in FIG. 2.

FIG. 3 is a circuit block diagram showing a configuration of the trigger filtering unit 16A. The trigger filtering unit 16A, which is constituted by hardware, comprises a condition determining unit 61, a write control signal generating unit 62, a plurality of trigger condition counters 631 to 63m, a selector 64 and an adder 65.

The trigger condition counters 631 to 63m are made to correspond, one to one, to a plurality of trigger conditions that can be pre-defined cut-through triggers. As the plural trigger conditions, for example, the port number (for example, telnet, ftp, http) of the TCP, the packet length (for example, more than 512 bytes), the multicast of the UDP, and the input/output line number of the packet can be employed.

By referring to the header information of the hop-by-hop packet assembled in the SAR 13, the condition determining unit 61 determines whether or not this packet meets any one of the plural trigger conditions. The write control signal generating unit 62 supplies a write control signal to the trigger condition counter corresponding to the trigger condition determined by the condition determining unit 61. The selector 64 selectively supplies to the adder 65 a count value of the trigger condition counter corresponding to the trigger condition determined by the condition determining unit 61.

The trigger condition counters 631 to 63m store the count values of the number of transfers of the hop-by-hop packet meeting the trigger conditions corresponding respectively to the counters. The count values of the number of transfers are selectively input to the adder 65 by the selector 64, incremented (+1) in the adder 65, and written in the trigger condition counters 631 to 63m from which they have been read, by enabling the counters corresponding to the conditions by the write control signal generating unit 62.

The processor 15A, for example, which has a microcomputer as its control unit, implements by the software processes a function of selecting the trigger condition that should be the cut-through trigger in accordance with the count values of the trigger condition counters 631 to 63m of the trigger filtering unit 16A, a function of determining which of the cut-through transfer and the hop-by-hop transfer should be executed in accordance with the selected trigger condition, a function of executing the routing process for the hop-by-hop transfer in the network layer, and various functions in layers higher than the network layer.

Figure 4:
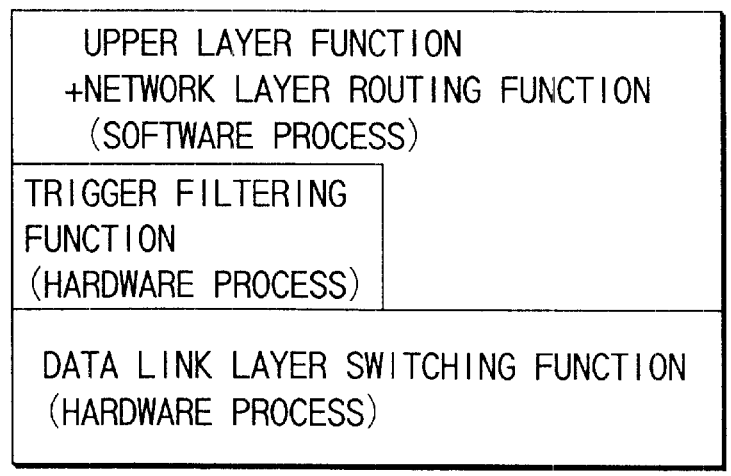
FIG. 4 is a view showing a concept in a basic configuration of the repeater shown in FIG. 2.

FIG. 4 shows a conceptional configuration of functions of the repeater according to the first embodiment described above.

Next, the operations of the above-constituted repeater will be described.

When the ATM cells of the data flow in which the cut-through transfer is set arrive at the ATM switch unit 11 via the input lines IL1 to ILn–1, the ATM switch unit 11 switches the ATM cells of the data flow and transfers them to the output lines corresponding to the destinations in accordance with the switching information stored in the switching table 12.

On the other hand, when the ATM cell of the data flow in which execution of the cut-through transfer or the hop-by-hop transfer is not decided arrives, the ATM switch unit 11 inputs the ATM cell to the SAR 13 via the output line OLn in accordance with the switching information stored in the switching table 12. The input ATM cell is assembled to be the packet in the frame memory 14. When the SAR 13 has finished the packet assembly, the SAR 13 informs the processor 15A that the trigger packet has arrived, together with the stored address of the trigger packet in the frame memory 14.

The processor 15A, which has received the information, selects the trigger condition which should be the cut-through trigger at the current time, in accordance with the count values stored in the trigger condition counters 631 to 63m of the trigger filtering unit 16A, and determines whether or not the trigger packet stored in the frame memory 14 meets the selected trigger condition. If the trigger packet meets the selected trigger condition as a result of the determination, the switching information is set on the switching table 12 to subject the data flow meeting the condition to the cut-through transfer.

Therefore, after that, the ATM cell of the same data flow arriving via the input lines IL1 to ILn–1 is subjected to the cut-through transfer to any one of the output lines OL1 to OLn–1, in accordance with the switching formation which is set on the switching tale 12 by the ATM switch unit 11.

On the other hand, if the trigger packet does not meet the trigger condition as a result of the above determination, the processor 15A executes the hop-by-hop transfer process by employing the software.

That is, the hop-by-hop packet stored in the frame memory 14 is first disassembled by the SAR 13 into cells, which are input to the ATM switch unit 11 via the input line ILn, and which are then transmitted via the output line corresponding to the destination, of the output lines OL1 to OLn–1, by the ATM switch unit 11 in accordance with the switching information of the switching table 12.

After that, when the ATM cells of the same data flow arrive via the input lines IL1 to ILn–1, the ATM cells are also transferred from the ATM switch unit 11 to the SAR 13 and assembled to be the hop-by-hop packet in the SAR 13. In the processor 15A, the routing process for the hop-by-hop transfer is executed in accordance with the header information (i.e. the source address, the destination address and the like) of the hop-by-hop packet.

Every time the hop-by-hop packet arrives, the packet count process for detecting the traffic of the hop-by-hop transfer is executed in accordance with each of the trigger conditions, in the trigger filtering unit 16A.

That is, when the hop-by-hop packet is assembled in the SAR 13, the condition determining unit 61 determines whether or not a plurality of the pre-defined trigger conditions include any one meeting the hop-by-hop packet, in accordance with the header information of the hop-by-hop packet. If the trigger condition meeting the hop-by-hop packet exists as a result of the determination, the corresponding one of the trigger condition counters 631 to 63m is selected by the selector 64, and its count value is input to the adder 65 and incremented (+1). The incremented count value is written in the trigger condition counter from which the count value is read out, in accordance with the write control signal generated from the write control signal generating unit 62. If a plurality of meeting trigger conditions exist, the count values of the corresponding trigger condition counters 631 to 63m are incremented one after another in the same manner as the above-mentioned one.

Every time the hop-by-hop packet is received, the processor 15A takes the count values of the respective trigger condition counters 631 to 63m and calculates the rate of the traffic meeting each of the trigger conditions to all the traffics of the hop-by-hop transfer in accordance with the count values. The processor 15A selects the trigger condition under which this rate exceeds a preset threshold value as the cut-through trigger. After that, the processor 15A determines in accordance with this trigger condition whether or not the received packet should be subjected to the cut-through transfer or the hop-by-hop transfer, and executes the routing process on the basis of the determination. If a plurality of trigger conditions under which the rate exceeds the preset threshold value exist, the conditions are selected as the cut-through triggers respectively.

In the above descriptions, a case where the count value under each of the trigger conditions is indefinitely counted up is described. However, since counting up indefinitely is actually impossible, the count at the trigger condition counters 631 to 63m is subtracted by a constant value in every constant period. With this structure, the number of bits in each of the trigger condition counters 631 to 63m can be limited and the counter can be miniaturized and, of course, the variation of the current traffic can be exactly detected by periodically clearing old count values.

As described above, according to the first embodiment, the number of transfers of the hop-by-hop packet meeting a plurality of preset trigger conditions respectively is counted in the trigger filtering unit 16A, while the routing process selectively employing the cut-through transfer or the hop-by-hop transfer in accordance with the trigger conditions is executed. In the processor 15A, the rate of the traffic meeting each of the trigger conditions to all the traffics of the hop-by-hop transfer is calculated in accordance with the count value for each of the trigger conditions obtained in the trigger filtering unit 16A, then it is determined which of the cut-through transfer mode and the hop-by-hop transfer mode should be selected, by selecting the trigger condition under which this rate exceeds a preset threshold value as a cut-through trigger, and the routing process in each of the modes is executed.

Therefore, the trigger condition under which the rate to all the traffics of the hop-by-hop transfer is large is selected as a cut-through trigger in response to the variation in inclination of the arrival of the hop-by-hop packet. As a result, the traffic of the cut-through transfer can be always maintained highly and thereby the efficiency of communication of the repeater can be enhanced. In addition, since the trigger filtering unit 16A is constituted by a simple counter circuit, there is no fear that the circuit configuration of the repeater may be complicated or the repeater may be constituted in a larger size.

The above descriptions have exemplified the port number (for example, telnet, ftp, http) of the TCP, the packet length (for example, more than 512 bytes), multicast of the UDP, and the input/output line number of the packet. Here, characteristics of the respective conditions will be explained.

First, the port number of the PCT has been conventionally employed. In the prior art, however, only an application whose session duration is considered long is fixedly defined as a cut-through trigger. On the other hand, in the embodiment of the present invention, a plurality of TCP port numbers that can be cut-through triggers are defined as trigger conditions, in consideration of TCP port numbers that are to be used in future. The TCP port numbers are set in the processor 15A.

As for the packet length, a packet having a length of more than 512 bytes is defined as a trigger condition. The reason for "more than 512 bytes" is that the default packet length of the IP is 576 bytes and that the packet of 512 bytes is one of the peak values of the traffic of passing through the repeater. In addition, when the packet length is determined, only the 9th bit of the packet length is referenced, which can be simply carried out.

The UDP protocol is basically inclined to used only in a closed network. If the UDP protocol is used in a closed network, the cut-through transfer does not need to be executed. However, a UDP multi-cast is considered as the UDP packet assumed at present, which passes through a plurality of repeaters. Therefore, as for the UDP packet, the rate of the traffic of the cut-through transfer can be enhanced by defining the multi-cast packet as a condition under which it can be a cut-through trigger.

If the input/output of the packet are executed via a specific line, the rate of the traffic of the cut-through transfer can be enhanced by defining the input/output line of the packet as a condition under which it can be a cut-through trigger.

(2nd Embodiment)

In the second embodiment of the present invention, the routing process of the hop-by-hop packet is not executed by the software process of the processor, but by the hardware.

Figure 5:
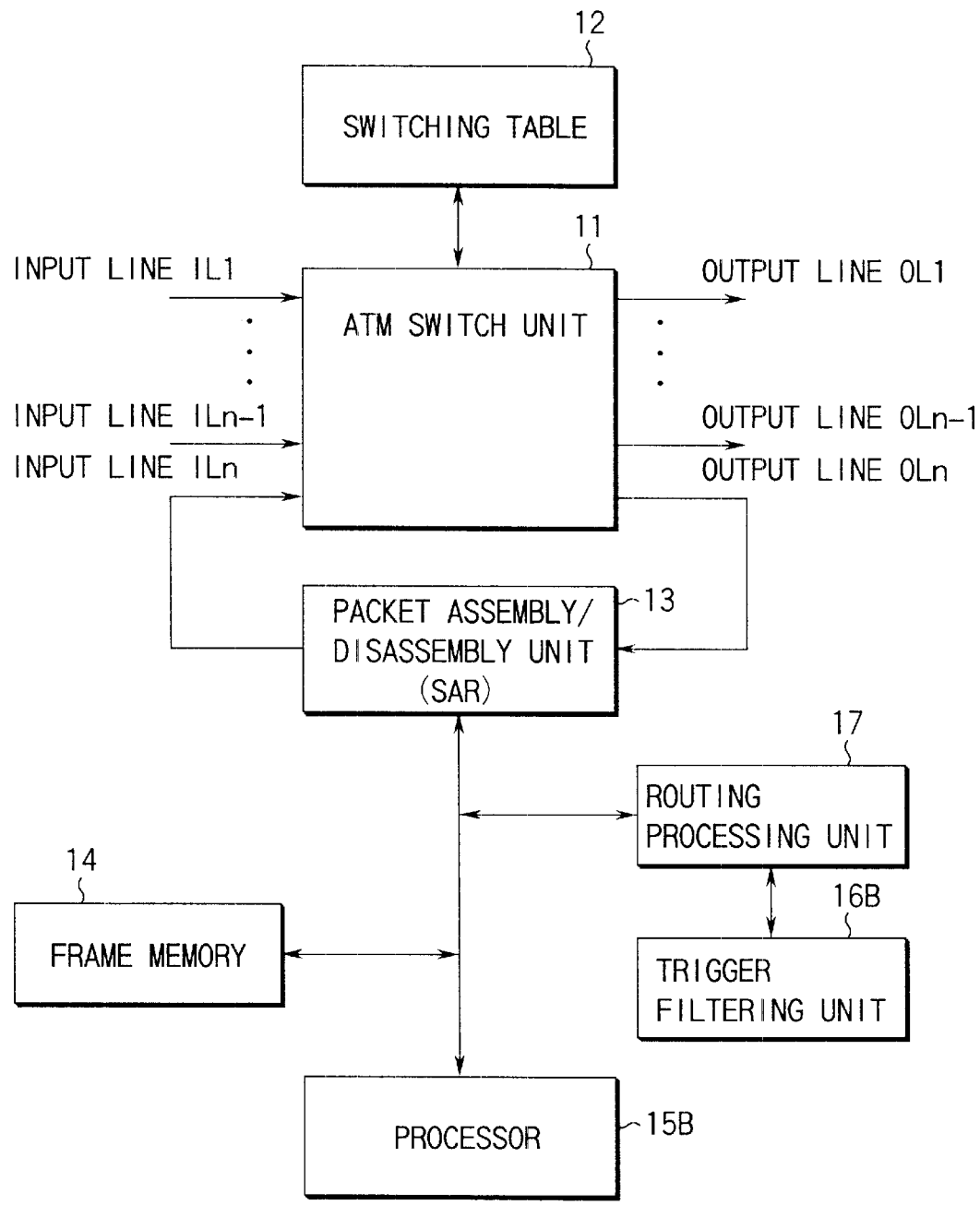
FIG. 5 is a block diagram showing a second embodiment of a repeater according to the present invention.

FIG. 5 is a view showing a schematic configuration of the repeater according to the second embodiment of the present invention. The same portions as those shown in FIG. 2 are denoted by the same reference numerals in FIG. 5 and their explanation is omitted.

In the repeater of this embodiment, a routing processing unit 17 is provided independently of a processor 15B. The routing processing unit 17 starts in response to the fact of being informed by the SAR 13 that assembly of the hop-by-hop packet has been finished, and executes the routing process by the hardware in accordance with the header information (i.e. the source address, the destination address and the like) of the hop-by-hop packet stored in the frame memory 14.

A trigger filtering unit 16B receives the header information of the hop-by-hop packet via the routing processing unit 17, and determines in accordance with the header information whether or not the trigger condition which the packet meets is included in the plural trigger conditions that can be the cut-through triggers in the condition determining unit 61. If the trigger condition meeting the packet is included in the plural trigger conditions, the count value of the corresponding trigger condition counters 631 to 63m is counted up by the adder 65.

Figure 6:
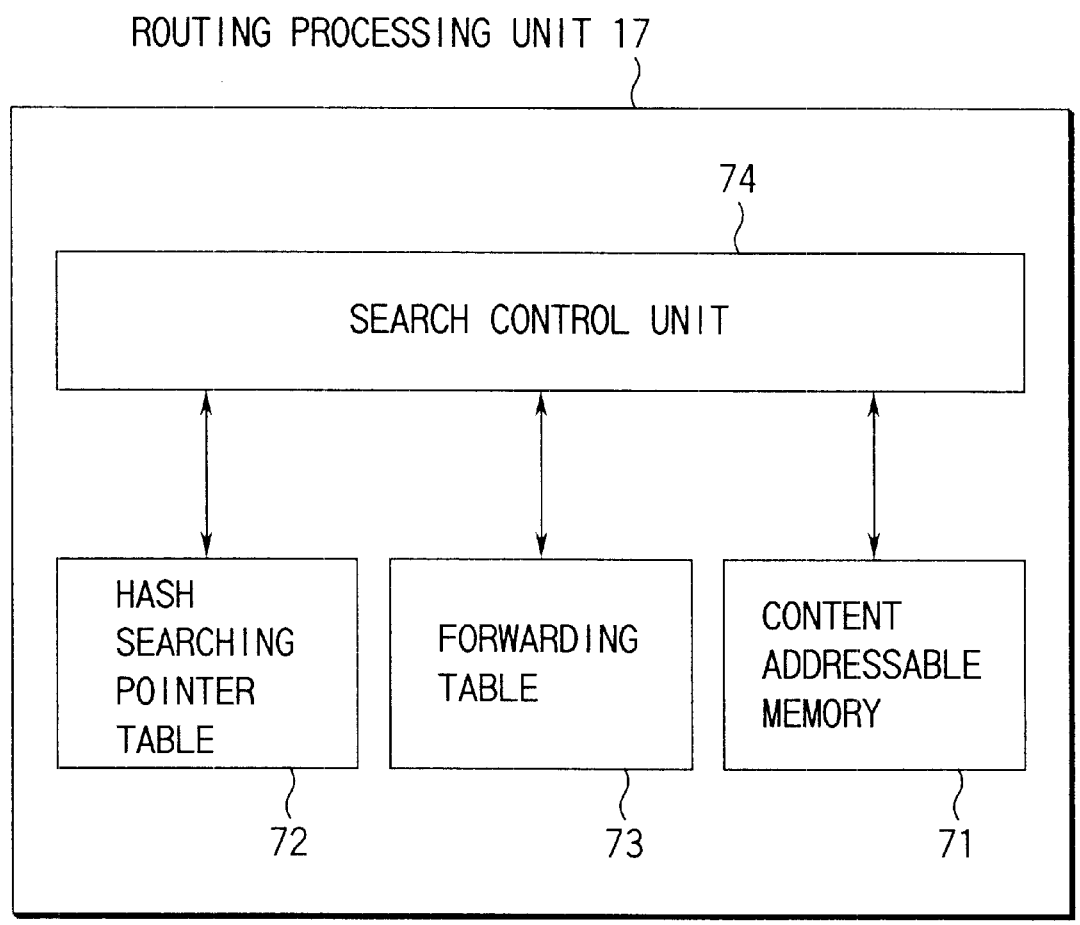
FIG. 6 is a block diagram showing a configuration of a routing processing unit in the repeater shown in FIG. 5.

FIG. 6 is a circuit block diagram showing a configuration of the routing processing unit 17. The routing processing unit 17 is constituted by a content addressable memory 71, a HASH searching pointer table 72, a forwarding table 73 and a search control unit 74.

The header information and pointer information concerning the communications of comparatively high frequency of communication are stored in the content addressable memory 71. FIG. 7 shows an example of the memory information. Destination IP addresses, source IP addresses, destination port numbers and source port numbers, which constitute the header information, are stored as search keys, and pointer information corresponding to the header information is also stored. The pointer information is used as a key when a forwarding table 73 to be described later is searched. The content addressable memory 71 has a search function of executing the searching by using the input header information as the search key, and outputting the pointer information corresponding to the header information when the corresponding header information is stored.

The HASH searching pointer table 72 is used when a transfer destination is searched by an HASH function, and the destination IP addresses and pointer information concerning the communications of low frequency of communication are stored in, for example, SRAMs and DRAMs. FIG. 8 shows an example of the stored information.

Various kinds of the forwarding information items are stored in advance on the forwarding table 73. FIG. 9 shows an example of the stored information. VPIs (Virtual Path Identifiers), VCIs (Virtual Channel Identifiers), QOS flags (Quality of Service Flags) and the like are stored as the forwarding information.

The search control unit 74 is constituted by, for example, a logic circuit, which extracts the header information from the IP packet data stored temporarily in the frame memory 14. In accordance with the extracted header information, the search control unit 74 selectively accesses the content addressable memory 71 or the HASH searching pointer table 72 and searches for the corresponding pointer information. The search control unit 74 also accesses the forwarding table 73 in accordance with the researched pointer information to search for the corresponding forwarding information.

The processor 15B has a function of searching for the hop-by-hop transfer destination by the software process in the same manner as that seen in the prior art. If the routing process unit 17 fails to search for the transfer destination, the processor 15B executes its own searching function to search for the transfer destination.

With this configuration, every time the packet is assembled by the SAR 13, the count value of the trigger condition meeting the packet is counted up in the trigger filtering unit 16B. In the processor 15B, the rate of the traffic meeting each of the trigger conditions to all the traffics of the hop-by-hop transfer is calculated, in accordance with the count value stored in each of the trigger condition counters 631 to 63m. The trigger condition under which this rate exceeds the preset threshold value is selected as the cut-through trigger, and it is determined in accordance with this trigger condition whether the received packet should be subjected to the cut-through transfer or the hop-by-hop transfer.

As a result of the determination, if the cut-through transfer is selected, the switching information to subject the ATM cell of the data flow to the cut-through transfer is set from the processor 15B to the switching table 12. Therefore, after that, the ATM cell of the same data flow having arrived via the input lines IL1 to ILn−1 is subjected to the cut-through transfer via any one of the output lines OL1 to OLn−1, in accordance with the switching information which is set on the switching table 12 by the ATM switching unit 11.

On the other hand, if the hop-by-hop transfer is selected as a result of the determination, the routing process for the hop-by-hop transfer is executed by the hardware using the content addressable memory 71, the HASH searching pointer table 72, the forwarding table 73 and the search control unit 74, in the routing processing unit 17.

Next, the hop-by-hop transfer operation executed in the routing processing unit 17 will be explained in further detail.

When a plurality of ATM cells arrive via the lines of the upstream side, these cells are transmitted to the SAR 13 via the ATM switch unit 11 and reconstructed in the SAR 13 to the IP packet data, which is stored in the frame memory 14.

When the IP packet data is stored in the frame memory 14, the routing processing unit 17 extracts the header information from the IP packet data by the search control unit 74. The search control unit 74 uses the destination IP address, the source IP address, the destination port number and the source port number included in the header information as the keys to execute the following search for the transfer destination information (i.e. the forwarding information).

Figure 10:
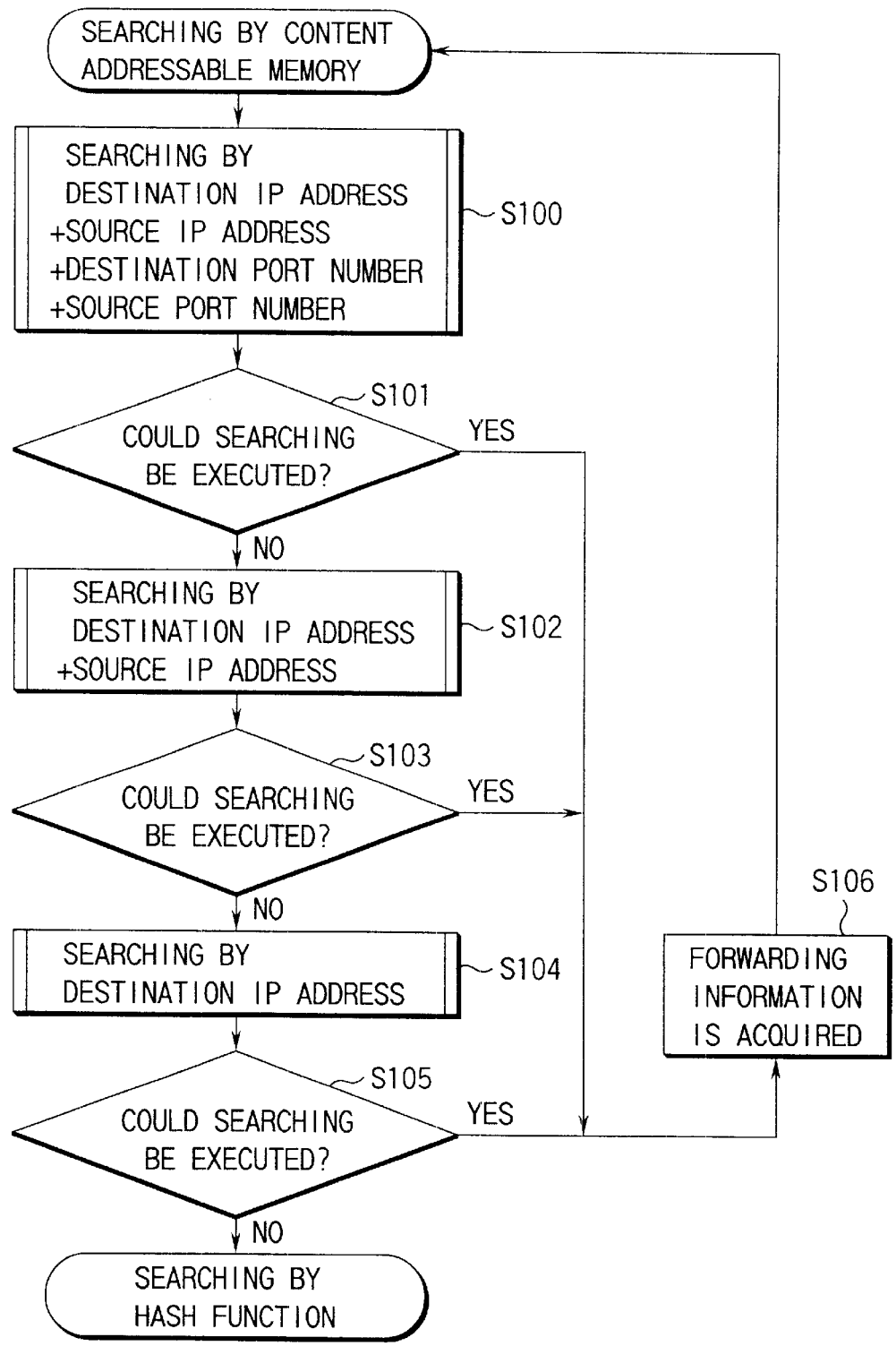
FIG. 10 is a flow chart showing IP address searching steps using the content addressable memory in the routing processing unit shown in FIG. 6 and the contents of the IP address searching steps.

That is, first, searching is executed by the content addressable memory 71. FIG. 10 is a flow chart showing its operation steps and the contents of the operations.

In step S100, the search control unit 74 inputs all the information items included in the header information, i.e. the destination IP address, the source IP address, the destination port number and the source port number to the content addressable memory 71. The content addressable memory 71 searches for the header information which all of these information items match and transmits the pointer information corresponding to the matched header information back to the search control unit 74. If the header information which all of these information items match is stored, step S101 shifts to step S106, in which the search control unit 74 accesses the forwarding table 73 in accordance with the pointer information to acquire the corresponding forwarding information (VPI, VCI, QOS flag and the like).

The SAR 13 and the ATM switch unit 11 are operated in accordance with the forwarding information, and thereby the IP packet data stored in the frame memory 14 is disassembled in the SAR 13 into cells, which are transmitted from the ATM switch unit 11 to the output line.

On the other hand, it is assumed that the header information which all the information items meet could not have been searched as a result of the searching of the content addressable memory 71. The step shifts to step S102, and the search control unit 74 selects the destination IP address and the source IP address, of all the information items included in the header information, and inputs the destination IP address and the source IP address to the content addressable memory 71. The content addressable memory 71 searches for the matching header information and transmits the pointer information corresponding to the matched header information back to the search control unit 74. That is, the information items that can be the keys are reduced and searching is executed again by the content addressable memory 71. As a result, if the matched header information can be searched, step S103 shifts to step S106 and the corresponding forwarding information is acquired from the forwarding table 73 as mentioned above.

If a plurality of matched header information items exist, the content addressable memory 71 transmits the pointer information corresponding to the header information of a higher priority back to the search control unit 74, in accordance with a predetermined order of priority.

On the other hand, if the matched header information cannot be searched even by the searching using the destination IP address and the source IP address as the keys, the search control unit 74 further reduces the keys to the only destination IP address and inputs the destination IP address to the content addressable memory 71, and the content addressable memory 71 searches for the matched header information and transmits the pointer information corresponding to the matched header information back to the search control unit 74, in step S104. If the matched header information can be searched, the corresponding forwarding information is acquired from the forwarding table 73 in step S106.

Furthermore, if the matched header information cannot be searched, header information matching the destination IP address masked at the MSB side is input again to the content addressable memory 71 to execute the searching, in consideration of a subnet mask. If the matched header information is found, the corresponding forwarding information is acquired from the forwarding table 73 in step S106.

Figure 11:
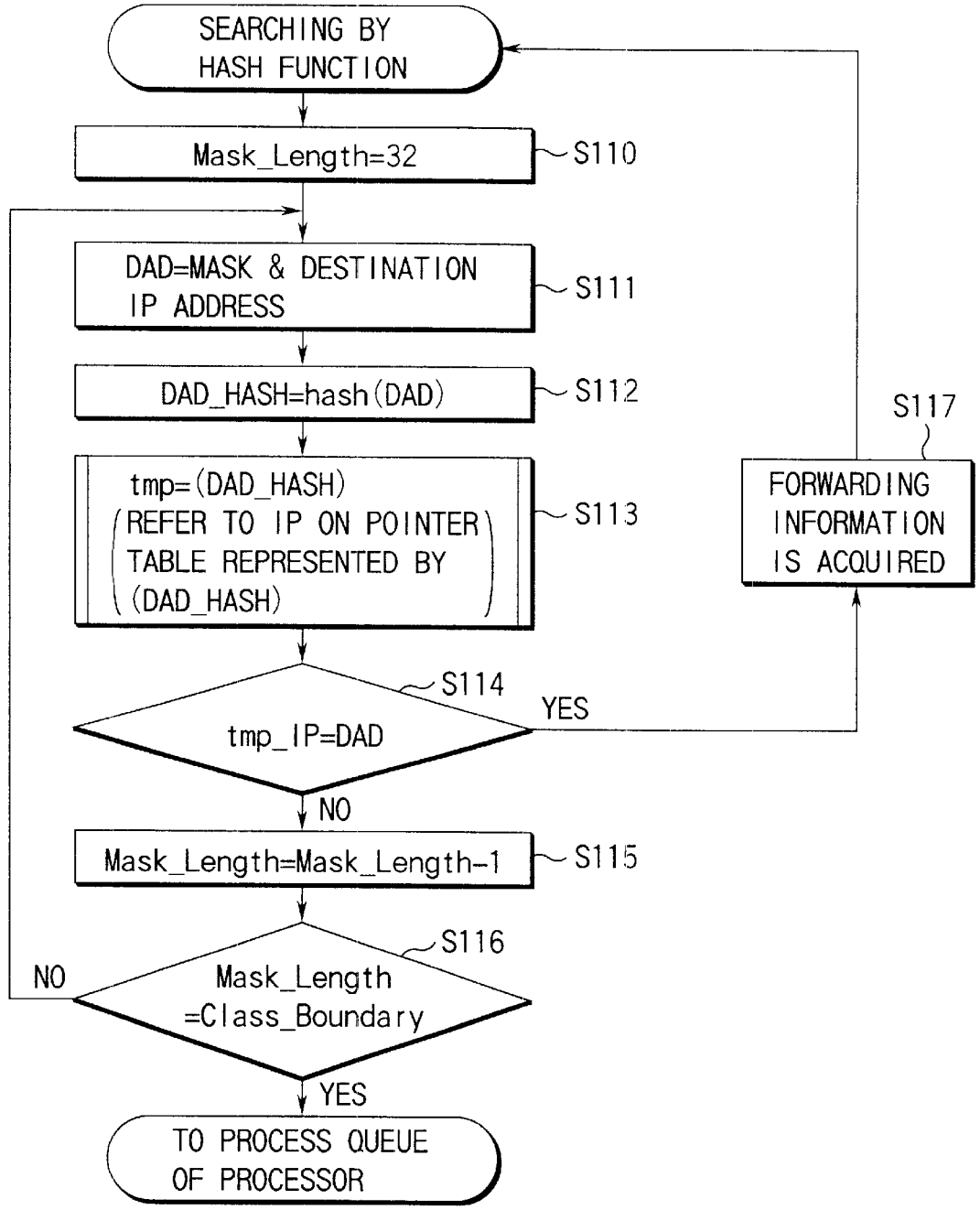
FIG. 11 is a flow chart showing IP address searching steps using the HASH searching pointer table in the routing processing unit shown in FIG. 6 and the contents of the IP address searching steps.

Incidentally, it is assumed that the transfer destination information cannot be acquired by the above search of the content addressable memory 71. The routing processing unit 17 shifts to a next operation of searching using the HASH searching pointer table 72. FIG. 11 is a flow chart showing its operation steps and their operation contents.

The HASH function is a function of mapping, for example, a 32-bit destination IP address over a corresponding bit string of less than 32 bits, by a certain compressing algorithm.

The search control unit 74 first sets the mask length at a longest value, i.e. Mask Length=32 in step S110, and inputs a destination IP address masked with the maximum mask value in step S111 to the HASH function in step S112. In step S113, the search control unit 74 refers to a destination IP address of the HASH searching pointer table 72 represented by the output of the HASH function. As a result of the referring, when the destination IP address stored in the HASH searching pointer table 72 matches the masked destination IP address, step S114 shifts to step S117 to read the corresponding pointer information stored on the HASH searching pointer table 72, make an access to the forwarding table 73 by using the pointer information as a key and acquire the corresponding forwarding information (VPI, VCI, QOS flags and the like).

On the other hand, when the destination IP address stored in the HASH searching pointer table 72 does not match the masked destination IP address before being input to the HASH function, the mask length is shortened by one bit by considering a subnet mask in step S115 and the destination IP address is masked from the MSB side by the shortened mask length in step S111. Then, search control unit 74 inputs the masked destination IP address to the HASH function in step S112 to refer to the destination IP address on the HASH searching pointer table 72 represented by the output of the HASH function. When the destination IP address stored on the HASH searching pointer table 72 matches the masked destination IP address before being input to the HASH function, the corresponding forwarding information is acquired from the forwarding table 73 as described above.

However, when both addresses do not match, the mask length is further shortened by one bit in step S115, and the destination IP address is masked again with the further shortened mask and input to the HASH function. The search control unit 74 refers to the destination IP address on the HASH searching pointer table 72 represented by the output of the HASH function. If a destination IP address matching the masked destination IP address before being input to the HASH function is found, the corresponding forwarding information is acquired from the forwarding table 73. However, if no destination IP address is found, the mask length is further shortened and the above HASH search operation is repeated.

In the above-described HASH search operation, if the forwarding information cannot be acquired by shortening the mask length to a predetermined length, the search control unit 74 shifts from step S116 to the process queue of the processor 15B, thereby assigning the operation to the search executed by the software process of the processor 15B.

Figure 12:
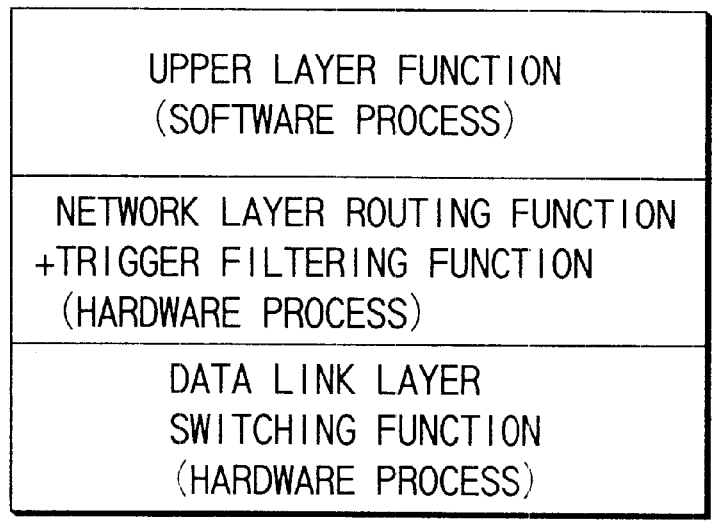
FIG. 12 is a view showing a concept in a basic configuration of the repeater shown in FIG. 5.

FIG. 12 is a view showing a schematic arrangement of the functions of the repeater according to the present embodiment.

As described above, the present embodiment can achieve the following advantage, in addition to the advantage which is achieved by variably selecting the trigger conditions in accordance with the traffic of the hop-by-hop transfer meeting the conditions as described in the above first embodiment. That is, when the received packet does not meet the trigger condition selected as the cut-through trigger and the hop-by-hop transfer is selected, the routing process of the hop-by-hop transfer is executed in the routing process unit 17 which is the hardware. For this reason, not only the routing process of the cut-through transfer, but also that of the hop-by-hop transfer can be accelerated, and thereby the efficiency of communication of the repeater can be further enhanced.

(Other Embodiment)

In the first and second embodiments, only the number of transfer packets under each of the trigger conditions is counted by the trigger filtering units 16A and 16B. However, a process of calculating the rate of the traffic under each of the trigger conditions to all the traffics of the hop-by-hop transfer in accordance with the count value, and a process of selecting the trigger condition which can be the cut-through trigger in accordance with the calculated traffic rate, may be constituted to be executed by the trigger filtering units 16A and 16B. With this configuration, the processes up to selection of the trigger condition can be executed by using the hardware and thereby the processing speed at determination of the cut-through trigger can be further accelerated.

In addition, in the first embodiment, the upper layer function and the network layer routing process are implemented by the software process of the processor 15A and each of the data link layer switching process and the trigger filtering process is implemented by the hardware, as shown in FIG. 4. In the second embodiment, only the upper layer process is implemented by the software process of the processor 15B, and each of the data link layer switching process, the trigger filtering process and the network layer routing process is implemented by the hardware, as shown in FIG. 12.

Figure 13:
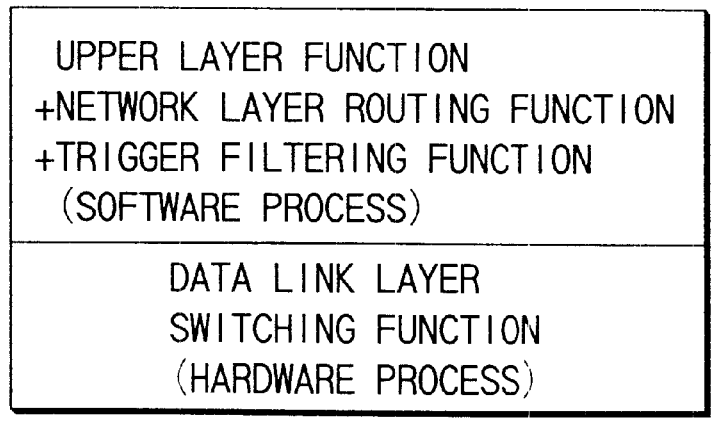
FIG. 13 is a view showing a concept of the repeater according to the other embodiment of the present invention.

However, the configuration of the repeater is not limited to these. As shown in FIG. 13, for example, each of the upper layer process, the trigger filtering process and the network layer routing process may be implemented by the software process of the processor 15B, and only the data link layer switching process may be implemented by the hardware.

In addition, the kind and the number of the trigger conditions, the circuit configuration of the trigger filtering unit, the configuration, processing steps, processing contents and the like of the traffic monitoring means, condition selecting means and routing processing means can be variously modified in a range which does not exceed the gist of the present invention.

INDUSTRIAL APPLICABILITY

As described above, in the present invention, the traffic of the hop-by-hop transfer meeting each of a plurality of predetermined conditions that can be the cut-through triggers is detected, and the traffic detection value of each condition is compared with a predetermined threshold value to select the condition under which the traffic exceeds the threshold value as the cut-through trigger. After that, it is determined whether the received packet should be subjected to the cut-through transfer or the hop-by-hop transfer, in accordance with this selected condition, and the routing process is executed in accordance with the result of the determination.

Therefore, according to the present invention, the trigger condition with a higher traffic of the hop-by-hop transfer at the current time can be selected and used as the cut-through trigger in accordance with the variation in the traffic environment, and thereby the traffic of the cut-through transfer can be increased to provide a repeater which can enhance the efficiency of communication.

What is claimed is:

1. A repeater having a hop-by-hop transfer mode in which a packet routing process is executed in a network layer and a cut-through mode in which a packet switching process is executed in a data link layer, for executing a packet routing process by selectively using the modes, comprising:

traffic monitoring means for detecting a traffic of the hop-by-hop transfer meeting each of a plurality of predetermined conditions that can be cut-through triggers;

condition selecting means for comparing an amount of the traffic of each of the conditions obtained by said traffic monitoring means with a predetermined threshold value, and selecting a condition under which the amount of traffic exceeds the threshold value as the cut-through trigger; and routing processing means for determining whether a received packet should be subjected to the cut-through transfer or the hop-by-hop transfer in accordance with the condition selected by said condition selecting means, and executing the routing process in accordance with a result of the determination.

2. A repeater according to claim 1, wherein said traffic monitoring means selects a plurality of conditions as the conditions which can be the cut-through triggers and detects the traffics of the hop-by-hop transfer meeting the respective conditions.

3. A repeater according to claim 1, wherein said traffic monitoring means has a counter for counting number of transfer traffics of hop-by-hop packet meeting each of the plurality of predetermined conditions that can be the cut-through triggers, and said condition selecting means obtains a rate of the traffic under each of the conditions to entire hop-by-hop transfer traffics in accordance with the count value of each of the conditions obtained by the counter of said traffic monitoring means, and selects a condition under which the rate exceeds the threshold value as a cut-through trigger.

4. A repeater according to claim 1, wherein said traffic monitoring means detects the traffics, in a certain previous period, of the hop-by-hop transfer meeting each of the plurality of predetermined conditions that can be cut-through triggers.

5. A repeater according to claim 1, wherein the traffic detection process of the said traffic monitoring means, and the cut-through transfer process and the hop-by-hop transfer process of said routing processing means are executed with hardware circuits, respectively, and the process of selecting the condition which can be the cut-through trigger by said condition selecting means is executed in the software process with a processor.

* * * * *